Figure 1:
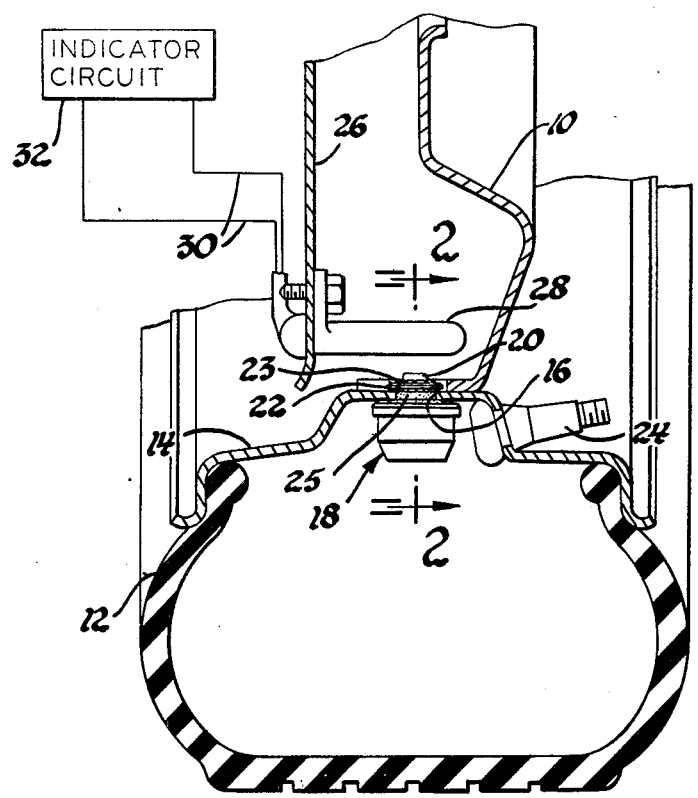

# United States Patent [19]

Stewart et al.

[11] 4,134,102
[45] Jan. 9, 1979

[54] LOW TIRE PRESSURE DETECTOR

[75] Inventors: John A. Stewart, Flint; Roy G. Hynes, Flushing, both of Mich.

[73] Assignee: General Motors Corporation, Detroit, Mich.

[21] Appl. No.: 851,489

[22] Filed: Nov. 14, 1977

[51] Int. Cl.² ............................................. B60C 23/04
[52] U.S. Cl. .................................. 340/58; 200/61.25; 200/83 C; 200/83 L
[58] Field of Search ............ 340/58; 200/61.22, 61.25, 200/83 A, 83 C, 83 L, 83 SA; 73/146.3, 146.5, 146.8

[56] References Cited

U.S. PATENT DOCUMENTS

| | | | |
|---|---|---|---|
| 3,521,230 | 7/1970 | Poole | 340/58 |
| 3,654,601 | 4/1972 | Munson et al. | 340/58 |
| 3,977,355 | 8/1976 | Lorenz et al. | 116/34 R |
| 3,978,448 | 8/1976 | Vago | 340/58 |
| 3,982,225 | 9/1976 | Schlanzky | 340/58 |

Primary Examiner—Donald J. Yusko
Assistant Examiner—Joseph E. Nowicki
Attorney, Agent, or Firm—Warren D. Hill

[57] ABSTRACT

A low tire pressure detector and magnetic signal sending unit includes a bellows charged to a reference pressure for moving a magnet from a shielded position to a signal emitting position when tire pressure operating outside the bellows decreases to a predetermined value. A latching force is established by the magnet to operate against the bellows force to help maintain the magnet in the shielded or non-signalling position. The magnitude of the latching force is controlled by a polepiece of thin cross section which saturates under the influence of the magnet to limit the latching force to a fixed value. The spring force of the bellows is sufficient in the absence of a pressure differential to overcome the latching force and move the magnet to signalling position. A ferrous slug mounted on the movable end of the bellows is magnetically coupled to the magnet assembly to form a releasable connection between the magnet assembly and the bellows.

1 Claim, 2 Drawing Figures

U.S. Patent

Jan. 9, 1979

4,134,102

LOW TIRE PRESSURE DETECTOR

This invention relates to a low tire pressure sensor and in particular to a combined low tire pressure detector and magnetic signal sending unit.

It has been proposed previously to provide a low tire pressure sensor in a tire which compares the tire pressure with some reference pressure and causes a magnetic signal to be emitted when the tire pressure reaches a predetermined low value. The magnetic signal is then detected by a sensor in a circuit which gives an indication of the low tire pressure condition. It is necessary then that a clear unmistakable magnetic signal be provided to actuate the sensor when the low tire pressure condition occurs. This necessitates a high ratio of signal "on" to signal "off" magnetic flux at the sensor position. In addition the sending unit should emit a strong signal, it should accurately respond to the desired low pressure set point and the unit should also be easily manufactured.

It is therefore an object of the invention to provide a low tire pressure detector and magnetic signal sending unit which is easily manufactured and yet has an accurate response to low tire pressure to emit a strong magnetic flux signal having a high "on" to "off" ratio.

It is a further object to provide such a sensor operated by a pressure responsive bellows which is fail-safe in the sense of emitting a signal if a leak occurs in the bellows.

The invention is carried out by providing a low tire pressure sending unit having a bellows charged to a reference pressure and subject to tire pressure, a magnet assembly which is coupled magnetically to the bellows for movement by the bellows when changing tire pressure calls for movement of the magnet assembly to signalling position or retraction to non-signalling position, a polepiece of the magnet assembly which makes latching contact with a magnetic flux shunt member and has a thin lip portion, and the magnet being strong enough to saturate that lip portion to limit the latching force between the polepiece and the flux shunt to a valve controlled by the dimensions of the polepiece thereby fostering accuracy of manufacturing independent of manufacturing variations of magnet strength. The invention is further carried out by providing a bellows having a spring force sufficient in the absence of pressure differential across the bellows to overcome the magnetic latching force and move the magnet assembly to signalling position.

Figure 2:
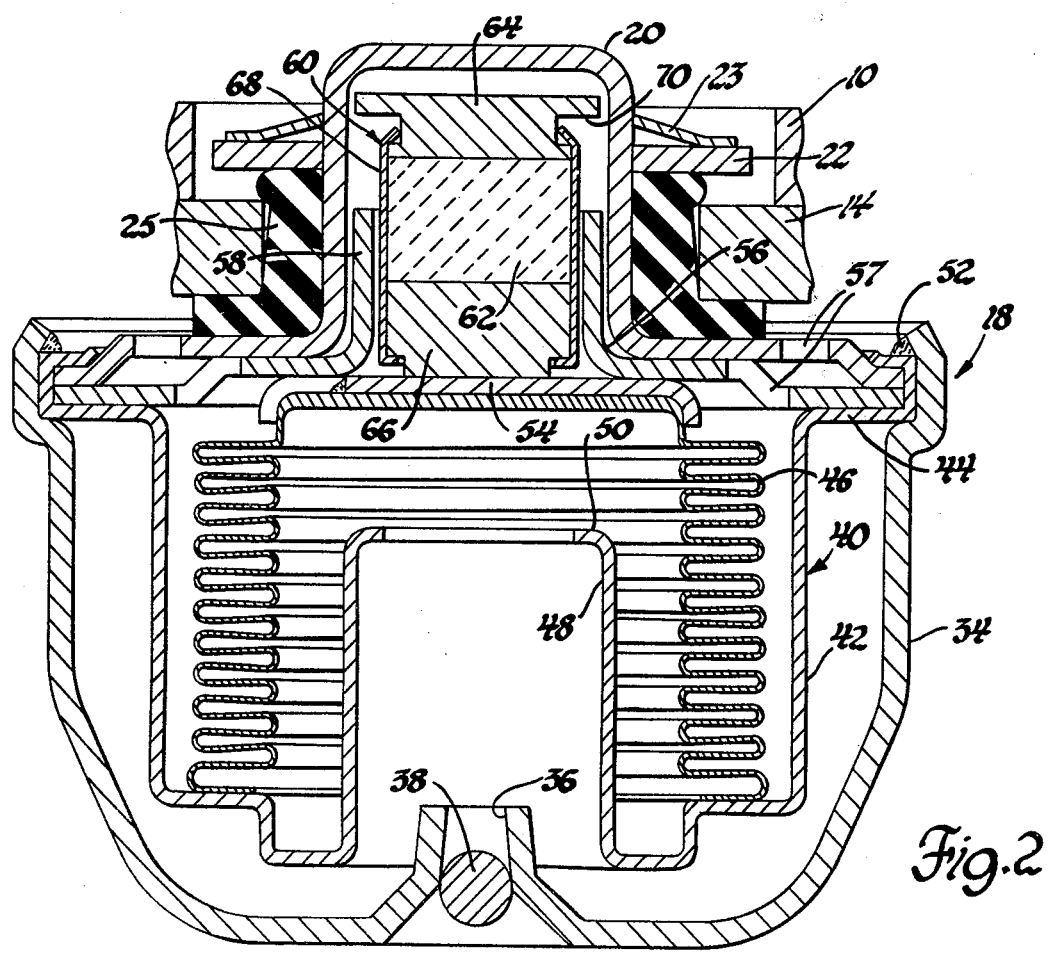

These and other objects and advantages of the invention will be made apparent from the following description and from the accompanying drawings in which:

FIG. 1 is a view of a low tire pressure warning system including a tire mounted low pressure detector and sending unit according to the invention; and FIG. 2 is a cross sectional view of the low tire pressure detector and magnetic signal sending unit according to the invention.

In the drawings a wheel 10 carrying a tire 12 has a drop center rim 14 having an aperture 16 to which a pressure detector and sending unit 18 is mounted. Sending unit 18 is located primarily within the tire but has a cap portion 20 extending through the rim. A washer 22 and push nut 23 applied to the cap portion 20 fastens the sender 18 to the rim via an expanded seal 25 which forms an air tight connection. A conventional tire stem 24 is also secured to an aperture in the rim and extends laterally therefrom. A stationary backing plate 26 mounted adjacent the vehicle wheel carries a sensor 28 which is located adjacent to the path of the sender 18 as it moves with wheel rotation. The sensor 28 comprises a reed switch or the like which is sensitive to a magnetic field of a predetermined minimum value. A pair of electrical conductors 30 connect the sensor 28 to indicator circuit 32 which provides a warning when tire pressure reaches a preassigned low level.

The low pressure detector and magnetic signal sending unit 18 is shown in detail in FIG. 2. The unit 18 includes a housing 34 having at one end an inwardly projecting conical opening 36 into which a ball 38 is seated to provide a gas tight seal. A bellows assembly 40 is mounted in the housing 34 and comprises a bellows 46 rested within an outer cup shaped support member 42 having a radially extending outer flange 44 which is seated and sealed in a recess of the housing 34. The bellows is metallic and is of conventional structure. In this assembly the bellows is compressed from its free state so that it has a spring force exerted outwardly. The bellows 46 has one end mounted in a gas tight seal to the bottom of the cup member 42 and has its free end extending toward the side of the cup member which carries the flange 44. An inwardly projecting tubular portion 48 of the cup member 42 terminates in a radially inwardly turned flange which forms a stop 50 which is positioned to engage the free end of the bellows 46 upon bellows contraction to prevent an extreme compression of the bellows. The tubular member 48 is open ended to provide communication between the interior of the bellows 46 and the space between the cup member 42 and the housing 34. The total space thus defined then becomes a precharged chamber containing a gas at a predetermined reference pressure. The extra volume of the chamber provided by the space between the cup member 42 and the housing 34 increases the total chamber capacity so that variations in chamber volume due to normal travel of the bellows causes only minor variations in reference pressure. To assure a gas tight seal between the housing 34 and the flange 44 of the cup member a solder bead 52 is formed between a lip of the housing and the flange.

The outer surface of the free end of the bellows 46 carries a steel slug 54. The bellows assembly also supports a flux shunt member 56 of steel and a brass cap 20. The cap 20 and the flux shunt member 56 each have radially extending flanges which engage the flange 44 and which are retained by a bent over portion of the flange 44. Apertures 57 in the cap 20 and the flux shunt member 56 allow communication of tire air pressure with the space between the bellows 46 and the interior of the cup member 42. The brass cap is a hat shaped member which forms a protective enclosure. The flux shunt member 56 has a central open-ended tubular portion 58 which lies along the inner surface of the cap 20 but which extends only part way along the length of the cap 20. A magnet assembly 60 is contained within the cap 20 and the tubular member 58 for axial sliding movement therein. The magnet assembly 60 includes a permanent magnet 62 of a rare earth material which when magnetized has a high energy product, and a pair of polepieces 64 and 66 mounted on the outer and inner ends of the magnet 62 respectively. The megnet 62 has opposite poles adjacent the polepieces. A brass shell 68 is wrapped around the magnet and the polepieces to complete the magnet assembly and has inturned ends gripping shoulders formed on the polepieces 64 and 66 to secure the elements of the magent assembly. The brass shell 68 in addition to maintaining the integrity of the assembly provides a sliding bearing surface and assures spacing between the magnetic material of the magnet assembly and the tubular portion 58. The polepiece 64 contains a radially extending circumferential flange 70 which is substantially the same in diameter as the tubular shield 58 outer diameter and abuts the ends of the shield 58 upon bellows contraction and movement of the magnet assembly to retracted or non-signalling position (in FIG. 2 the magnet assembly and the bellows is shown in extended or signalling position). The flange 70 on the pole piece 64 is sufficiently thin in its axial direction that it is saturated by the magnetic flux from the magnet 62 when the flange 70 is in contact with the tubular shield 58. In that position, the flange 70 is magnetically latched to the tubular shield 58 but the latching force is limited due to the saturation of the flange 70. Thus, it is possible to control the magnetic latching force by the selection of the proper dimension of the flange 70. The magnet 62 is selected to have sufficient energy product to maintain the flange 70 saturated when it is latched to the tubular shield 58. The magnet energy product may vary throughout a substantial range beyond that required to saturate the flange 70 and the latching force will not vary. The polepiece 66 is magnetically latched to the slug 54 carried by the bellows 46. This feature expedites the assembly of the bellows to the magnet assembly since no riveting or other fastening method is required and there is no concern about centering the magnet assembly within the tubular shield 58 since the location to the magnet assembly on the slug is self adjusting.

When tire pressure is low the bellows and the magnet assembly assume the extended signalling position shown in FIG. 2 of the drawing. A strong magnetic signal is emitted from the polepiece 64 for detection by the sensor 28. The magnetic flux path includes the flux shunt element 56 and the polepiece 66 which are bridged by the slug 54. Upon tire inflation to normal pressure the tire pressure acting against the bellows moves the bellows toward the travel stop 50 until the flange 70 of the polepiece 64 abuts the end of the tubular shield 58. If the tire pressure becomes sufficiently great to overcome the latching force between the polepiece 66 and the slug 54, those pieces will separate and the free end of the bellows will come to rest against the travel stop 50 thereby protecting the bellows from extraordinary compression which might occur during excessive tire overpressure conditions. The decoupling of the polepiece 56 and the slug 54 also relieves stress on the shell 68 which would occur in the event of an overpressure condition. The magnetic flux path is chiefly through the polepiece 64, the flux shunt element 56, and across an air gap to the polepiece 66. Relatively small flux leakage occurs in the region of the polepiece 64, thus providing a high "on" to "off" flux ratio.

Reduction of tire pressure below a normal pressure causes expansion of the bellows so that a bellows force is exerted counter to the latching force between the flange 70 and the tubular shield 58. When the bellows force finally exceeds the latching force the magnet assembly will be expelled to its extended position with a step motion. Then the ferrous slug 54 carried by the bellows engages the flux shunt member 56 which acts as a travel stop in the expansion direction of the bellows. That contact also serves as a magnetic latch which tends to hold the magnet assembly in the signalling position until substantial pressure is restored to the tire.

The bellows spring force apart from the differential pressure acting on the bellows is selected to be greater than the latching force between the flange 70 and the shield 56 when the bellows is in the retracted or non-signalling position. In the event a leak occurs in the bellows and the pressure across the bellows becomes balanced then the spring force of the bellows is sufficient to extend the magnet assembly to signalling position, thereby rendering the system fail-safe.

The assembly is calibrated by the following bellows charging procedure. First, air pressure simulating tire air pressure at the low pressure set point is applied through the holes 57 to the outside of the bellows 46. Then, with the ball 38 removed from the opening 36 of the housing, helium is applied under increasing pressure to the inside of the bellows until the magnet assembly unlatches. The unlatching event is sensed by a flux meter near the cap 20. Then the helium pressure is held constant and the air pressure is increased to ensure that the magnet assembly is against the over pressure stop 50, thus standardizing the bellows air volume. Then the ball 38 is seated in the opening 36 to seal the assembly by a force fit. In this manner tolerances in the various magnetic and spring forces are compensated for and the low pressure set point is established with accuracy.

It will thus be seen that the tire pressure detector and magnetic signalling device according to this invention provides an assembly which is easy to manufacture while at the same time maintaining switch point accuracy. In addition, a fail-safe feature is attained by controlling the latching force by the saturation of the flange of a polepiece and then utilizing a bellows spring force which in the absence of a pressure differential across the bellows is sufficient to overcome the latching force and move the magnet assembly to a signalling position.

The embodiments of the invention in which an exclusive property or privilege is claimed are defined as follows:

1. In a low tire pressure warning device, a combined low pressure detector and magnetic signal sending unit having a magnet assembly movable within a housing to an outer signal emitting position to generate a minimum strength magnetic flux field outside the housing and to an inner shielded position for which the magnetic flux field outside the housing is substantially below the said minimum strength, an expansible bellows responsive to tire air pressure for moving the magnet assembly to the outer position when tire pressure decreases below a set value and to the inner position when tire pressure increases to a value above the set value, the bellows having a spring force urging bellows expansion and charged inside with a gas at a reference pressure and exposed outside to tire air pressure, one end of the bellows secured relative to the housing and the other end of the bellows being free to move to effect bellows expansion upon decrease of tire pressure relative to the reference pressure, a slug of ferro-magnetic material secured to the free end of the bellows, such that the magnet assembly is attracted to the slug to form a releasable connection between the magnet assembly and the slug, a magnetic flux shunt element carried by the housing and positioned to contact the slug to provide a limit stop for bellows expansion, the flux shunt element including a tubular shield having its axis aligned with the direction of bellows movement, the magnet assembly being partially disposed in the said tubular shield and including a magnet having at least a minimum strength and a polepiece secured adjacent to one pole of the magnet, the polepiece having a radially extending circumferential flange disposed outside the tubular shield to abut the end of the shield to provide a limit stop for the magnet when in shielded position and to provide a flux path from the magnet and through the flux shunt element, the circumferential flange having a preset axial dimension sufficiently thin that it is saturated by the magnetic flux from the magnet when the flange is in contact with the tubular shield to thereby provide a present constant magnetic latching force between the flange and the shield, the bellows when contacting the magnet assembly in the inner shielded position having a spring force greater than the said preset latching force so that in the event of a loss of pressure differential across the bellows the bellows force alone is sufficient to overcome the preset latching force and move the magnet assembly to signal emitting position.

* * * * *